UNITED STATES PATENT OFFICE.

EMIL ELSAESSER, OF BARMEN, GERMANY, ASSIGNOR TO DAHL & CO., OF SAME PLACE.

BLUE DYE.

SPECIFICATION forming part of Letters Patent No. 524,677, dated August 14, 1894.

Application filed January 29, 1894. Serial No. 498,382. (Specimens.)

*To all whom it may concern:*

Be it known that I, EMIL ELSAESSER, a subject of the King of Würtemberg, Germany, residing at Barmen, a city of the Kingdom of Prussia, German Empire, have invented certain new and useful Improvements in Blue Dyes, of which the following is a specification.

My invention relates to a process for obtaining a blue coloring matter, which dyes wool and silk in an acid bath.

The process consists in treating beta-dinaphthylmetaphenylendiamin disulfonic acid in a dilute acetic solution with nitrosodimethylanilin or dimethylamidoazobenzene or its sulfonic-acid as follows: Fifty-six kilograms (one molecule) of a soda salt of the beta-dinaphtylmetaphenylendiamindisulfonic-acid are dissolved in one thousand liters of water, then to this solution are added twenty kilograms acetic-acid of thirty per cent. and twenty kilograms acetate of sodium and then the solution is cooled down to 5° to 10° centigrade. Twenty-eight kilograms (one and a half molecules) of freshly prepared hydrochloric nitrosodimethylanilin, finely divided with water, are then added, at the same time well stirring the solution, and the latter is then well stirred for twenty-four hours. The solution, which is at first brownish yellow passes gradually, by the partial separation of the coloring matter into green and then to blue. The solution is now neutralized with soda, heated to 60° to 70° centigrade, and the separation of the coloring matter is then completed by the addition of common salt.

The probable structural formula of the obtained coloring matter is—

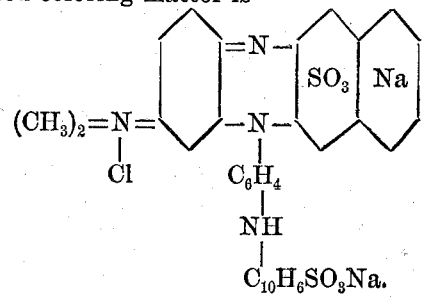

The coloring matter forms a dark powder of bronze splendor, which powder dissolves easily in water with a reddish blue color. By adding diluted sulfuric acid to the dilute solution of the coloring matter the free color acid will be separated (*ausgeschieden*). In concentrated sulfuric acid the coloring matter dissolves with blue-green color.

The same coloring matter is also produced when the beta-dinaphthylmetaphenylendiamin sulfonic-acid in a dilute acetic solution is heated for several hours up to 90° to 100° centigrade with dimethylamidoazobenzene or its sulfonic-acid.

Having fully described my invention, what I desire to claim and secure by Letters Patent is—

1. The process for obtaining a blue coloring matter, which consists in treating the beta-dinaphthylmetaphenylendiamin disulfonic-acid in a dilute acetic solution with nitrosodimethylanilin, as set forth.

2. The herein described blue coloring matter derived from beta-dinaphthylmetaphenylendiamin disulfonic-acid and nitrosodimethylanilin which coloring matter dissolves itself easily in water and dyes wool and silk in an acid bath blue.

In testimony whereof I have signed my name to this specification in the presence of subscribing witnesses.

EMIL ELSAESSER.

Witnesses:
    A. DINFINGER,
    RUDOLF DAHL,
    WILLIAM ESSENWEIN,
    F. H. STRAUSS.